United States Patent [19]

Auracher et al.

[11] 4,082,421
[45] Apr. 4, 1978

[54] DEVICE FOR COUPLING TWO LIGHT CONDUCTING FIBER CABLES

[75] Inventors: Franz Auracher; Gerhard Mitterhummer; Karl-Heinz Zeitler, all of Munich, Germany

[73] Assignee: Siemens Aktiengesellschaft, Berlin & Munich, Germany

[21] Appl. No.: 688,718

[22] Filed: May 21, 1976

[30] Foreign Application Priority Data

May 22, 1975 Germany .............................. 2522763

[51] Int. Cl.² ............................................... G02B 5/14
[52] U.S. Cl. ................... 350/96.22; 350/96.15
[58] Field of Search ......................... 350/96 C, 96 B

[56] References Cited

U.S. PATENT DOCUMENTS

| | | | |
|---|---|---|---|
| 3,734,594 | 5/1973 | Trambarulo | 350/96 C X |
| 3,902,785 | 9/1975 | Matthews | 350/96 C |
| 3,910,678 | 10/1975 | McCartney et al. | 350/96 C |
| 3,917,383 | 11/1975 | Cook et al. | 350/96 C |
| 3,923,371 | 12/1975 | Dalgleish | 350/96 C |

*Primary Examiner*—John K. Corbin
*Assistant Examiner*—Rolf Hille
*Attorney, Agent, or Firm*—Hill, Gross, Simpson, Van Santen, Steadman, Chiara & Simpson

[57] ABSTRACT

A device for coupling an incoming light conducting fiber cable to an outgoing light conducting fiber cable characterized by a pair of housings connected together and each receiving a holder which holders center the fibers in one cable in relation to the fibers of the cable which is centered by the other holder. The improvement comprises the holder includes a substrate having a first guide foil disposed on one surface and a second guide foil disposed on the opposite surface, each of said foils having aligned channels for receiving light conducting fibers with the channels of the first foil in a direction leading away from the substrate possessing a cross-sectional profile, decreasing to the diameter of the light conducting fibers. In one embodiment of the invention, the channels are apertures which are aligned with apertures or bores in the substrate and a modification of this embodiment includes forming the first guide foil of a plurality of layers with each layer having apertures converging towards the outer surface thereof with the outermost layer having the smallest aperture. In another embodiment, the channels in the first and second guide foils are arranged as perpendicular channels which extend beyond the peripheral surface of the substrate and, preferably, the light conducting fibers received in the channels are secured on the periphery of the substrate.

9 Claims, 8 Drawing Figures

DEVICE FOR COUPLING TWO LIGHT CONDUCTING FIBER CABLES

BACKGROUND OF THE INVENTION

1. Field of the Invention

The present invention is directed to a device and method for making the device for coupling an incoming light conducting fiber cable to an outgoing light conducting fiber cable wherein the light conducting fibers are centered in relation to one another by two adjoining holders.

2. Prior Art

Previously known plug connections for light conducting fiber cables generally employed guides provided with funnel-shaped openings for the light conducting fibers. The fibers are introduced into the funnel-shaped openings until they come into mechanical contact with the associated part as the parts are interconnected.

With every plug-in process, each fiber is subjected to mechanical stress. Also, a danger exists that when the fibers are introduced into the guides, dust is displaced onto the end faces of the fibers. In addition, it is difficult to produce by a mass production process the funnel-shaped guides with the required tolerance.

SUMMARY OF THE INVENTION

The present invention is directed to providing a device for coupling light conducting fiber cables in which the individual fibers of each cable are held fast in a precision holder and which device can be manufactured in a reproducible fashion by mass production techniques.

To accomplish these tasks, the present invention provides a device for coupling incoming light conducting fiber cables to outgoing light conducting fiber cables, said device comprising a pair of housings connected together and each receiving a holder, each holder centering the fibers in one cable in relation to the fibers of the other cable which are centered by the other holder, with the improvements comprising each holder comprising a substrate having a first guide foil disposed on one surface and a second guide foil disposed on the opposite surface thereof, each of said first foils having a channel for each light conducting fiber of its cable, said channels in a direction leading away from the substrate possessing a cross-sectional profile decreasing to the diameter of the light conducting fiber, said second foils having a channel for each light conducting fiber and aligned with the corresponding channel to the first foil, said light conducting fibers being disposed in the aligned channels of the first and second foils with the ends of the fibers being in the outer surface of the first foil and said device having means for optically interconnecting the ends of the light conducting fibers of one of said holders to the ends of the fibers of the other holder.

The means for optically interconnecting either positions the pair of holders with the ends of the fibers in direct contact with each other and preferably uses at least one centering pin between the pair of holders or comprises an optical system disposed between the pair of holders and preferably includes at least one centering pin extending between the pair of housings to ensure alignment of the ends of the fibers.

In one embodiment of the invention, the channels of each of said first and second guide foils are apertures which are aligned with bores provided in the substrate. If desired, the first guide foil may be formed of a plurality of layers with each layer having an aperture converging towards the outer surface thereof with the outermost layer having the smallest aperture.

In a second embodiment of the invention, the channels of each of the first and second guide foils are arranged peripherally thereon and extend beyond the peripheral surface of the substrate. Preferably, the light conducting fibers received in the channels of the first and second guide foils are secured on the peripheral surface of the substrate.

A method of producing the device comprises providing a template having a bore for each of the fibers of the cable with the bores being arranged in a pattern of the desired position for the fibers, forming the perforated plates by using the template to locate each of the positions of each of the perforations and then subsequently forming the perforations in the plate, assemblying and aligning the perforated plate onto the template by means of an alignment pin, inserting the ends of the light conducting fibers of the cable through the perforations of the plate and the bores of the template, securing the fibers in the perforated plate by filling the space of each perforation surrounding the fibers with a synthetic resin, said resin when hardened coacting with the plate to form the holder, removing the holder from the template, finishing the ends of the fibers by grinding and polishing the ends extending from a surface of the holder and subsequently assemblying the holder in the housing.

The precision positioning of the ends of the fibers in all of the holders is achieved either by use of a master template during forming of the channels or by forming the channel directly in a planar technique by means of photolithography using a light sensitive plastic sheet and a subsequent electrodeposition process which yields a negative copy of photolithographic pattern. As known, the advantage of the use of a planar process consists in the tight tolerances of the components being produced by the method and the high reproducibility that is obtained.

The coupling devices may be constructed to be either non-detachable or detachable coupling devices. The coupling devices can be constructed to enable switching over between a plurality of conducting fibers.

DESCRIPTION OF THE PREFERRED EMBODIMENTS

Figure 1:
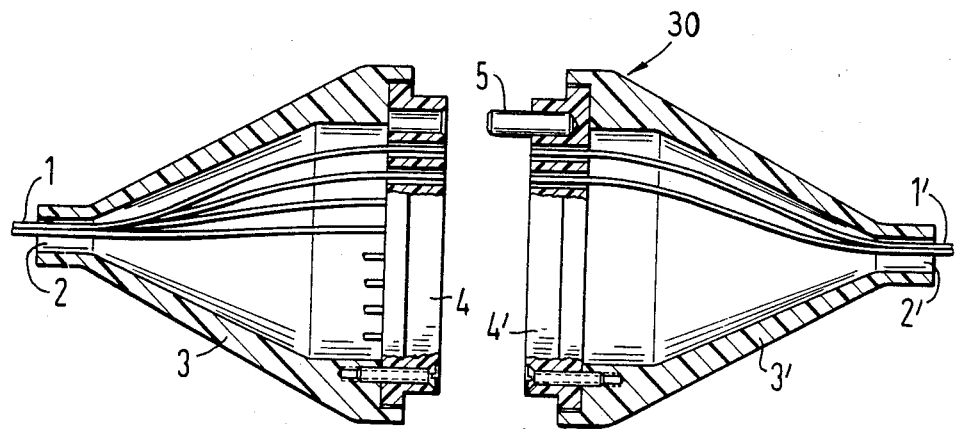
FIG. 1 is a cross-sectional view with portions in elevation for purposes of illustration of a device for coupling in accordance with the present invention.

The principles of the present invention are particularly useful when incorporated in a device, which is generally indicated at 30 in FIG. 1, for interconnecting or coupling the fiber ends of a light conducting fiber cable 1 to the fiber ends of a light conducting fiber cable 1'.

As illustrated, the device 30 comprises a pair of housings 3 and 3' which have openings 2 and 2', respectively. The cables 1 and 1' are inserted through the opening and the individual fiber ends are secured in channels in holders 4 and 4', which are mounted in the housings 3 and 3'. The housings 3 and 3' are connected together by at least one centering pin 5 in such a manner that the end faces of the light conducting fibers which are to be connected together are precisely opposite one another. This relationship is always obtainable due to the fact that the end surfaces of the holders 4 and 4' which touch one another are produced by a mass production operation.

Figure 2:
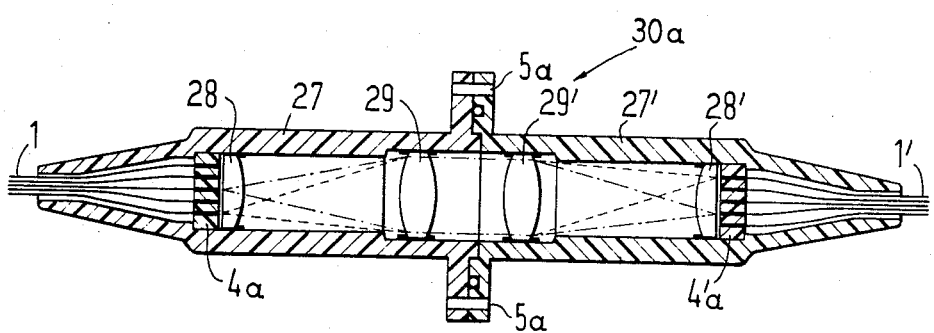
FIG. 2 is a cross-sectional view with portions in elevation for purposes of illustration of an embodiment of the coupling device in accordance with the present invention.

An embodiment of the device for interconnecting or coupling light conducting fiber cables 1 and 1' is generally indicated at 30a in FIG. 2. In the device 30a, the individual light conducting fibers for the cables 1 and 1' are coupled or connected together by an optical system. As illustrated, the device 30a includes a pair of housings 27 and 27' which receive holders 4a and 4a' which holders have the end faces or end surfaces of the fibers of the respective cables 1 and 1' disposed on a plane surface.

The optical system comprises a pair of field lenses 28 and 28' and a pair of focusing lenses 29 and 29'. The field lenses 28 and 28' are disposed in the housings 27 and 27' in front of the end faces or surfaces of the light conducting fibers secured in the holders 4a and 4a'. The focusing lenses 29 and 29' are received in the housings 27 and 27' in spaced relation to the field lenses 28 and 28' and focus the optical signals of each fiber of a fiber group such as 1 precisely onto the end faces of the opposite located fibers of the fiber group 1'. As illustrated, the housings 27 and 27' are detachably secured together by connecting pins 5a.

The device 30a which uses an optical system comprising a lens system for interconnecting the signal from one fiber cable 1 to fiber cable 1' has an advantage that by selection of the lenses and the distance between the oppositely located fiber ends in the holders 4a and 4a', it is possible to connect cables having different fiber diameters. In addition, the coupling or connection is less liable to become dusty as the light signals which are to be coupled from each fiber are distributed over the entire lens surfaces.

Figure 3:
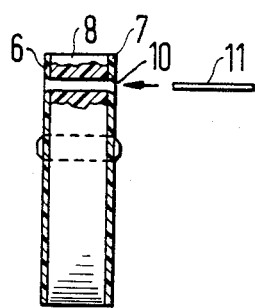
FIG. 3 is a cross-sectional view with portions in elevation for purposes of illustration of one embodiment of a holder in accordance with the present invention.
Figure 4:
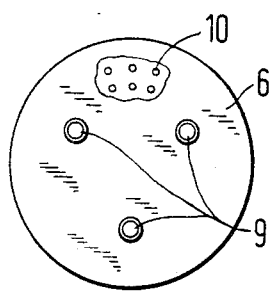
FIG. 4 is a side view of the holder illustrated in FIG. 3.

An embodiment of the holder is illustrated in FIGS. 3 and 4 and consists of two thin, highly precision perforated plates or foils such as the first guide foil 6 and the second guide foil 7 which are mounted on opposite surfaces of a substrate 8 which serves mainly as a spacing disk for the precision guide foils 6 and 7. To ensure accurate alignment of the apertures or perforations in the plates, which apertures or perforations formed the channels for the fiber such as 11, centering pins 9 (FIG. 4) are utilized.

The apertures or perforations 10 in the second guide foil 7 are dimensioned in such a manner that the light conducting fiber 11 possessing a maximum permissible diameter can still easily be inserted therethrough. The bores in the substrate 8 are also larger than the cross-sectional dimensions of the light conducting fiber 11. To ensure accurate positioning of the fiber ends, the apertures in the first guide foil 6 are dimensioned so that even fibers having the smallest permissible diameter are held with sufficient accuracy. After introducing the fibers such as 11 through the perforations or apertures of the second guide foil, the substrate and the first guide foil 6, they are glued in the bores and the end face of the holder which would be the exposed surface of the first guide foil 6 is surface ground and polished.

Figure 5:
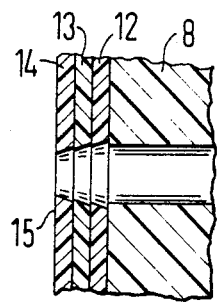
FIG. 5 is a partial cross sectional view of a modification of a holder illustrated in FIG. 3.

A modification of the structure of the embodiment illustrated in FIGS. 3 and 4 is illustrated in FIG. 5. In this modification, the first guide foil 6 is formed of three successive layers 12, 13 and 14 each possessing apertures having decreasing diameters. Each of these apertures has a conical or converging profile that converges towards an outer surface 15 of the foil 14 and the conical shape of these apertures or bores will facilitate the threading of the light conducting fiber therethrough. It should be noted that the three layers are utilized since the conical profile could only be produced photolithographically with a high precision in thin foils. As illustrated, the conical aperture in the layer 12 is slightly larger than the aperture in the layer 13 while the aperture in the layer 14 is smaller than the aperture in the layer 13. Thus, a light conducting fiber which is flush with the surface 15 of the layer 14 of the guide foil either possesses along its entire length the diameter corresponding to the smallest diameter of the conical bore or aperture of the layer 14 or if it has a somewhat larger diameter, its end zone can be conically tapered e.g. by etching the fiber in a mixture of hydroflouric acid and water and withdrawing the fiber slowly from the etchant to correspond to the smallest diameter of the apertures in the foil 14.

After inserting the fibers such as 11 through the aligned aperture in the second guide foil 7, the substrate 8 and through the bores of the layers 12, 13 and 14, the fiber is glued in place. After securing the fibers in the holder, the surface 15 is subsequently surface ground and polished.

Figure 6:
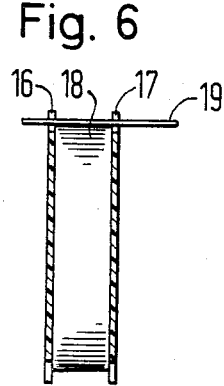
FIG. 6 is a cross-sectional view with portions in elevation for purposes of illustration of a second embodiment of a holder in accordance with the present invention.
Figure 7:
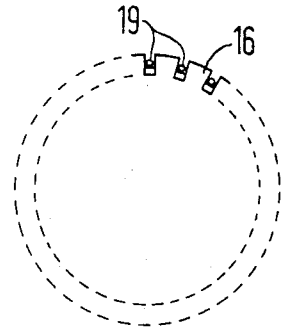
FIG. 7 is a side view of the holder of FIG. 6.

Another embodiment of the holder is illustrated in FIGS. 6 and 7. In this embodiment, the channels, which are utilized to guide the light conducting fibers, are arranged peripherally on the first guide foil 16 and the second guide foil 17 which are secured on opposite surfaces of a substrate 18 which has a cylindrical outer periphery. An accurate positioning of the fibers, such as 19, in both the radial and azimuthal direction is separately achieved. In order to achieve the radial positioning, the fibers 19 engage the peripheral outer surface of the cylindrical disk-shaped substrate 18 which had been previously ground to a precise diameter. The azimuthal positioning is achieved by both of the thin guide foils 17 and 18 being provided with channels which have a gear-like shape as best illustrated in FIG. 7 and the channels of at least the first foil slightly converges radially outwardly to the diameter of the fibers 19. A ring, which is not illustrated, will hold the fiber 17 firmly against the peripheral surface of the substrate 18 on which they may also be glued. Subsequently to the attaching of the fibers 19, the end face of the fibers and the outer surface of the foil 16 are surface ground and polished to be in a single plane.

A connecting device provided with any of the two holders can also be developed to form a mechanical switch. To this end, the two holders are coupled in such a manner that one holder may be rotated in relation to the other through a specific angle which is governed by a locking device. Thus, one fiber or a group of fibers secured in one of the pair of holders can be switched to another fiber or several separate groups of fibers secured in the second of the pair of holders.

Figure 8:
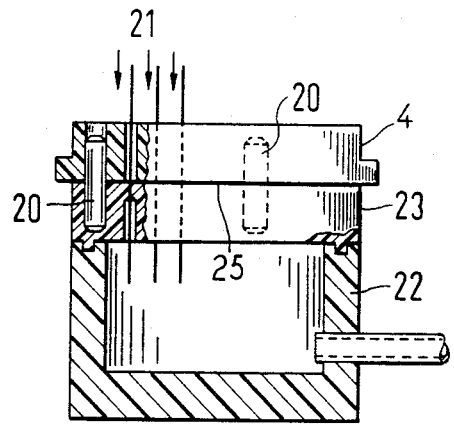
FIG. 8 is a cross-sectional view with portions in elevation for purposes of illustration of a device for assemblying the fibers in a holder in accordance with the present invention.

In FIG. 8, a device is illustrated for facilitating the assembly of the fibers into a holder such as 4 or 4a which is illustrated in FIGS. 1 and 2. The holder 4 has precisely positioned bores or apertures. To form such a holder, a perforated plate, which consists of a material having a low coefficient of thermal expansion, is formed by using a master template 23 to locate the position of each of the bores or apertures which are subsequently formed after the position has been determined. The template 23 possesses bores or apertures whose diameter is at a maximum only a fraction of a fiber diameter larger than the fiber diameter itself.

During the assembly, the perforated plate is positioned on the template 23 with its perforations being aligned and matched with the perforations in the template 23. This aligning is obtained by providing adjusting pins such as 20. The perforations which were formed in the perforated plate can initially have a diameter which is greater than the fiber as illustrated. Subsequent to the positioning of the perforated plate on the template, the fibers such as 21 are introduced in a direction indicated by the arrows through the bores in the perforated plate and into the bores of the template.

The threading of the fibers into these bores can be simplified by positioning the template 23 on an evacuation vessel 22. The vacuum inside the vessel 22 will cause the fibers to be sucked readily into the bores during the step of insertion.

After insertion of the fibers 21, a synthetic resin is poured into the bores of the perforated plate to fill the space surrounding the fibers. When the cast mass is hardened, the holder 4, which was formed from the perforated plate with the resin surrounding each of the fibers, is removed from the template 23. After removal, the surface 25 of the holder 4 with the light conducting fibers projecting therefrom is surface ground and polished to a smooth surface. Subsequent to the surface grinding and polishing, the holder is secured in the housing such as 3, 3' or the housing 27 and 27'.

The above described process, which could also be utilized with the holders which are illustrated in FIGS. 3–5, has the particular advantage when utilized with a holder such as 4, 4', 4a and 4a' which consist of a single thick component or plate.

Although various minor modifications may be suggested by those versed in the art, it should be understood that we wish to employ within the scope of the patent warranted hereon, all such modifications as reasonably and properly come within the scope of our contribution to the art.

We claim:

1. In a device for coupling an incoming light conducting fiber cable to an outgoing light conducting fiber cable, said device comprising a pair of housings connected together and each receiving a holder, each holder centering the fibers in one cable in relation to the fibers of the cable which are centered by the other holder with the improvements comprising each holder comprising a substrate having a first guide foil disposed on one surface and a second guide foil disposed on an opposite surface thereof, each of said first foils having a channel for each light conducting fiber of its cable, said channels in the direction leading away from the substrate possessing a cross-sectional profile decreasing to the diameter of the light conducting fiber, said second foil having a channel for each light conducting fiber aligned with the corresponding channel of the first foil, said light conducting fibers being disposed and secured in the aligned channels of the first and second foil with the end of the fibers being in the plane of the outer surface of the first foil and said device having means for optically interconnecting the ends of the light conducting fibers of one of said holders to the ends of the fibers of the other holder.

2. In a device according to claim 1, wherein the means for optically interconnecting positions of the pair of holders with the ends of the fibers in direct contact with each other.

3. In a device according to claim 2, which includes at least one centering pin extending between the pair of holders.

4. In a device according to claim 1, wherein the means for optically interconnecting comprises an optical system disposed between the pair of holders.

5. In a device according to claim 4, which further includes at least one centering pin extending between the pair of housings to ensure alignment of the ends of the fibers in the pair of holders.

6. In a device according to claim 1, wherein the channels in each of said first and second guide foils are apertures which are in alignment with bores in the substrate.

7. In a device according to claim 6, wherein the first guide foil is formed by a plurality of layers with each layer having an aperture converging towards the outer surface thereof with the outermost layer having the smallest aperture.

8. In a device according to claim 1, wherein the channels of each of the first and second guide foils are arranged peripherally thereon and extend beyond the peripheral surface of the substrate.

9. In a device according to claim 8, wherein each of the light conducting fibers received in the channels in the first and second guide foils are secured on the peripheral surface of the substrate.

* * * * *